(12) United States Patent
Lawson et al.

(10) Patent No.: US 8,552,697 B2
(45) Date of Patent: Oct. 8, 2013

(54) UNIVERSAL SINGLE-STAGE POWER CONVERTER WITH PFC CAPABILITY

(75) Inventors: Thomas E. Lawson, Malvern, PA (US); William H. Morong, Paoli, PA (US)

(73) Assignee: CogniPower, LLC, Malvern, PA (US)

( * ) Notice: Subject to any disclaimer, the term of this patent is extended or adjusted under 35 U.S.C. 154(b) by 343 days.

(21) Appl. No.: 13/015,891

(22) Filed: Jan. 28, 2011

(65) Prior Publication Data

US 2011/0187186 A1 Aug. 4, 2011

Related U.S. Application Data

(60) Provisional application No. 61/296,551, filed on Feb. 2, 2010.

(51) Int. Cl.
*G05F 1/00* (2006.01)

(52) U.S. Cl.
USPC ............ 323/222; 323/265; 323/271; 323/344

(58) Field of Classification Search
USPC ......... 323/222, 223, 265, 271, 282, 284, 290, 323/292, 311, 344, 345, 346
See application file for complete search history.

(56) References Cited

U.S. PATENT DOCUMENTS

| | | | |
|---|---|---|---|
| 6,320,358 B2 * | 11/2001 | Miller | 323/222 |
| 7,495,419 B1 * | 2/2009 | Ju | 323/259 |
| 7,633,782 B1 | 12/2009 | Herbert | |
| 2005/0017699 A1 | 1/2005 | Stanley | |
| 2006/0103365 A1 | 5/2006 | Ben-Yaacov | |
| 2007/0051712 A1 | 3/2007 | Kooken et al. | |
| 2008/0055940 A1 * | 3/2008 | Lawson et al. | 363/16 |
| 2008/0219032 A1 * | 9/2008 | Stancu et al. | 363/21.01 |
| 2009/0103341 A1 * | 4/2009 | Lee et al. | 363/124 |
| 2010/0045248 A1 * | 2/2010 | Hawley | 323/282 |

FOREIGN PATENT DOCUMENTS

WO WO2008089539 A1 7/2008

OTHER PUBLICATIONS

Notification of Transmittal of the International Search Report and the Written Opinion of the International Searching Authority, or the Declaration; Mailed Mar. 25, 2011 for corresponding PCT Application No. PCT/US2011/023121.

* cited by examiner

*Primary Examiner* — Nguyen Tran
(74) *Attorney, Agent, or Firm* — Mendelsohn, Drucker & Dunleavy, P.C.; Steve Mendelsohn

(57) ABSTRACT

A switched-mode power converter power converter, in one preferred embodiment with eight switches connected between three ports and an inductive element, with a donor (charging) port, a receptor port (load) and donor/receptor port (storage) operated so that energy may be switch between any of the ports regardless of the polarity and magnitude of the inductor current at the beginning of a chopping cycle. In one embodiment of the invention power conversion and power factor correction are accomplished in a single stage.

16 Claims, 7 Drawing Sheets

| State | Decimal | E/T | Port | Polarity | S1 | S2 | S3 | S4 | S5 | S6 | S7 | S8 |
|---|---|---|---|---|---|---|---|---|---|---|---|---|
| 1 | 1 | E | VP | | | x | | | | | | |
| 2 | 24 | T | Out | P | | | x | | | x | | |
| 3 | 8 | E | Out | | | | x | | | x | | |
| 4 | 33 | T | VP | N | | x | | | x | | | |
| 5 | 20 | T | VP | P | | | x | | x | | | |
| 6 | 0 | | | | | | x | | x | | | |
| 7 | 40 | T | Out | N | | | x | | | | | |
| 8 | 4 | E | VP | | | | x | x | | | | |
| 9 | 3 | E | VS | | | | | | x | | x | |
| 10 | 35 | T | VS | N | | | x | x | x | | | |
| 11 | 36 | T | VP- | N | | x | | | | | x | |
| 12 | 25 | T | Out | P | | x | | | | x | | |
| 13 | 19 | T | VS | P | | | | | x | | x | |
| 14 | 17 | T | VP- | P | | | | | x | | | |
| 15 | 34 | T | Out- | N | | | | | x | | | x |
| 16 | 18 | T | Out- | P | | | x | | x | | | x |
| 17 | 12 | E | VS | | x | | | | x | | | |
| 18 | 2 | E | Out- | | | | x | | | | | x |

FIGURE 7

UNIVERSAL SINGLE-STAGE POWER CONVERTER WITH PFC CAPABILITY

CROSS-REFERENCE TO RELATED APPLICATIONS

The present application claims the benefit of U.S. Provisional Application Nos. 61/296,551 filed on Feb. 2, 2010, which is incorporated herein by reference.

STATEMENT REGARDING FEDERALLY SPONSORED RESEARCH OR DEVELOPMENT

The present invention was not developed with the use of any Federal Funds, but was developed independently by the inventors.

BACKGROUND OF THE INVENTION

Conventional Power Factor Correction (PFC) uses a rectifier bridge followed by a separate boost stage. Such boost converters produce a relatively high voltage which is filtered and stored in a capacitor. A subsequent power stage reduces the voltage and regulates the output. Conventional PFC circuits operate in Discontinuous Conduction Mode (DCM), Continuous Conduction Mode (CCM), or Critical Mode. Each mode of operation has advantages and disadvantages, but changing from one mode to another is difficult or impossible for a particular controller. Further, these circuits are limited to matching input current to AC line voltage, and are not suited for applications which require more flexible control of input current.

U.S. Pat. No. 4,974,141, Severinsky et al, and U.S. Pat. No. 7,202,640 B2, Morita, teach single stage power converters with both regulation and improved PFC. Those devices rely on the output capacitance to filter line frequency ripple. That filter capacitance must then be much larger than in the usual case where only the much higher switching frequency need be filtered. Very large output capacitors are bulky and expensive and limit the agility of a power converter. AC output voltage or current is not feasible for power converters requiring large output filter capacitors.

BRIEF DESCRIPTION OF THE INVENTION

The desirability of smaller and more efficient power converters is well understood. This invention allows a single inductor, single stage, power converter to perform PFC and agile output regulation. Size and efficiency gains result. Further, this invention allows operation in DCM, CCM or Critical Mode, and can match the input current to the phase and shape of an arbitrary waveform.

As used herein a single inductor may mean a plurality of inductors in series or parallel and refers to the principal energy converting inductor of the power converter (for example, L1 in FIG. 1). Obviously, the power converter may have additional inductors throughout the circuit to accomplish current or voltage smoothing and filtering or for other well know circuit design purposes. Indeed, the load may be an inductive element within the circuit.

The ability to independently regulate multiple control loops using a single inductor in DCM/CCM operation is unique, and is a more generally useful ability. Devices made according to this invention can perform AC-AC conversion, act as uninterruptable power supplies, or can act as nodes in AC or DC power distribution networks.

Adding two more switches to the six-switch teaching of U.S. Pat. No. 7,786,709 (the '709 patent), by the same inventors, creates a truly universal power converter. The two additional switches connect from either side of the switched inductor to a storage port. That port can access a rechargeable battery, a capacitor, an ultracapacitor, or other electrically active device. That port can be used as an additional output port, or can connect to another bidirectional power converter for networked power. Stored energy can be of either polarity.

These devices can perform AC-AC, AC-DC or DC-AC conversion, and Power Factor Correction (PFC), power conditioning, and they can function as an uninterruptable power supply (UPS). As well, they can duplicate all the six-switch embodiment functions of the '709 patent. Just a few, or all, of the switches employed could need to be bipolar-blocking depending of the allowable polarities of the inputs and outputs.

The input current can be matched to any profile, provided externally, or derived from an AC power input waveform, or, the input voltage can be regulated by adjusting the input current. Input voltage and current regulation can be useful for maximization of photovoltaic panel power output. Controllable AC input current profiles enable dynamic vibration damping in wind generators. With storage, output regulation becomes independent of input regulation, and, in AC applications, output frequency becomes independent of input frequency.

Separate conventional converter stages can do the same jobs, but will require multiple inductors and potentially as many switches as this invention. Also, multiple conventional controllers would need to function in concert. According to this invention, much of the power converted need move only once through a single inductor from a preferred source to a preferred destination. Efficiency is thereby improved by reducing wasted energy due to inductive losses, extra gate drive energy and direct switching losses. The addition of a few extra switches allows fewer switch transitions and can enable the elimination of an entire stage of power conversion. Any extra complexity is primarily in the control intelligence, which is becoming faster, lower power, and lower cost every year.

The multiplexed examples cited above have two independent regulation processes time-sliced using a single inductor. One embodiment does PFC and rectification and regulation in a single stage. This technique takes the opportunism described in the '709 patent to a new level. The development of GaN switches (which are bipolar-blocking and very fast) will facilitate diverse embodiments of this invention. For example, additional bipolar ports and regulation processes could be more easily added. With DCM/CCM regulation well managed, and with fully bipolar energy movement capability, the distinction between energize and transfer states ceases to be central. Instead, the minimum and maximum continuous current in the switched inductor become additional parameters among the multiple parameters being regulated. Depending on the continuous current, the optimum operation at a given time could be either a transfer to a port of energy stored in the inductor, or an energize sub-cycle to first increase the inductive energy.

Each bidirectional, bipolar port requires four switches, one to either end of the switched inductor from either terminal of the port. With those switches, the added port can be placed in circuit with the switched inductor in either polarity. The inductor current can flow in either direction for any energize or transfer sub-cycle. In practice, many switches are redundant and need not be duplicated. For full bipolar, bidirectional flexibility with three ports sharing return paths, eight switches are needed.

In some topologies, a given port can either provide or receive energy during a particular chopping cycle. In those cases, designating a port as an input port or an output port may not yield best clarity. A given port can be said to function as a donor port when used as a source for energizing the inductor, regardless of polarity. A port can be called a receptor port when energy of either polarity is delivered to it from the inductor. Ports that function sometimes as donor ports and sometimes as receptor ports can be called donor/receptor ports.

The conventional means for Power Factor Correction (PFC) involves placing a boost converter stage in advance of the main regulation power stage. The main regulation stage is normally then a buck converter. All power runs through the boost stage and is stored as a relatively high voltage in a capacitor. That capacitor provides the input for the subsequent stage. There are more advanced forms of PFC referred to as bridgeless, because they do not have a separate diode bridge for rectification. "Bridgeless" PFCs do comprise bridges made of diodes and switches. The "bridgeless" form typically involves two switches and two diodes, or sometimes four switches, following two boost inductors. A Fairchild patent number 7269038 single-stage PFC and rectification describes the four-switch technique. Only a DC output is taught and claimed, and a subsequent stage is required for regulation. In essence, it is still a boost converter followed by a second stage for regulation.

The prior art separation of PFC and regulation is inherently inefficient. Every energy transfer incurs loses. Ideally, energy transfers should be minimized. This invention accomplishes that minimalization.

The concept of transferring energy opportunistically in an agile cycle-by-cycle controlled power converter is taught in the '709 patent. Bipolar, AC or DC energy can be transferred bidirectionaly using those teachings. The need for PFC when an input port is the AC line was not addressed. The need for local storage when performing AC to AC or AC to DC conversion was incompletely addressed.

A slightly modified version of the six-switch topology described in the '709 patent embodies both efficient storage and PFC all with a single inductor in a single stage converter. Storage can be any electrically activated bidirectional energy reservoir. Storage can be sufficient to provide a regulated output voltage in the absence of a power input voltage for a fraction of a single cycle, or for many hours.

In the preferred embodiment, two independent control loops are time multiplexed in one chopping cycle. One loop regulates the input current waveform, and the other regulates the output voltage. The switched inductor is first energized from the power input, VP, up to the amount required by the PFC reference signal. If a predictive energy balance calculation determines that the load will require additional energy after an energy transfer, inductor energizing is continued using the storage port as the source. In the preferred embodiment, inductive energy is then transferred to the output. Surplus energy obtained during the PFC subcycle is subsequently transferred from the inductor to storage. Alternatively, this invention may be practiced by transferring excess energy to storage before transferring the balance to the load.

The PFC limit can be dynamically scaled with a noncritical, slow feedback loop to keep the stored energy within preset limits. For normal PFC function, the PFC limit would be a rectified sinusoid in phase with the power input voltage. For other purposes, any arbitrary current input waveform could be reproduced that was within the bandwidth of the converter. In some applications, like wind turbines, the ability to independently regulate the input current waveform enables dynamic vibration control.

The storage port receives and supplies only energy that can not move directly from input to output. Thus, the total transferred energy and the number of energy movements are minimized.

The use of consecutive transfer periods was taught in the '709 patent. The use of consecutive energizing periods without an intervening transfer period is a departure from the prior art.

According to this invention, "N" ports can be served by (N−1) independent control loops, all using the same switched inductor. Thus, a multi-output converter or a node in a local power network that can move power, at will, between multiple ports can be embodied according to this invention.

In general, such embodiments of this invention are easier to understand if they operate in Discontinuous Conduction Mode because the two loops are unlikely to interact. However, Continuous Conduction Mode is useful for higher power systems. If sufficient control intelligence is provided to account for inductive energy differences instead of absolute energies, multiple control loops can intermingle without cross regulation, even in the presence of continuous inductor current. The ability to accommodate CCM is valuable for the construction of capable, opportunistic power converters.

BRIEF DESCRIPTION OF THE DRAWINGS

FIG. 7 shows a truth table for one implementation of the invention.

DETAILED DESCRIPTION OF THE INVENTION

Figure 1:
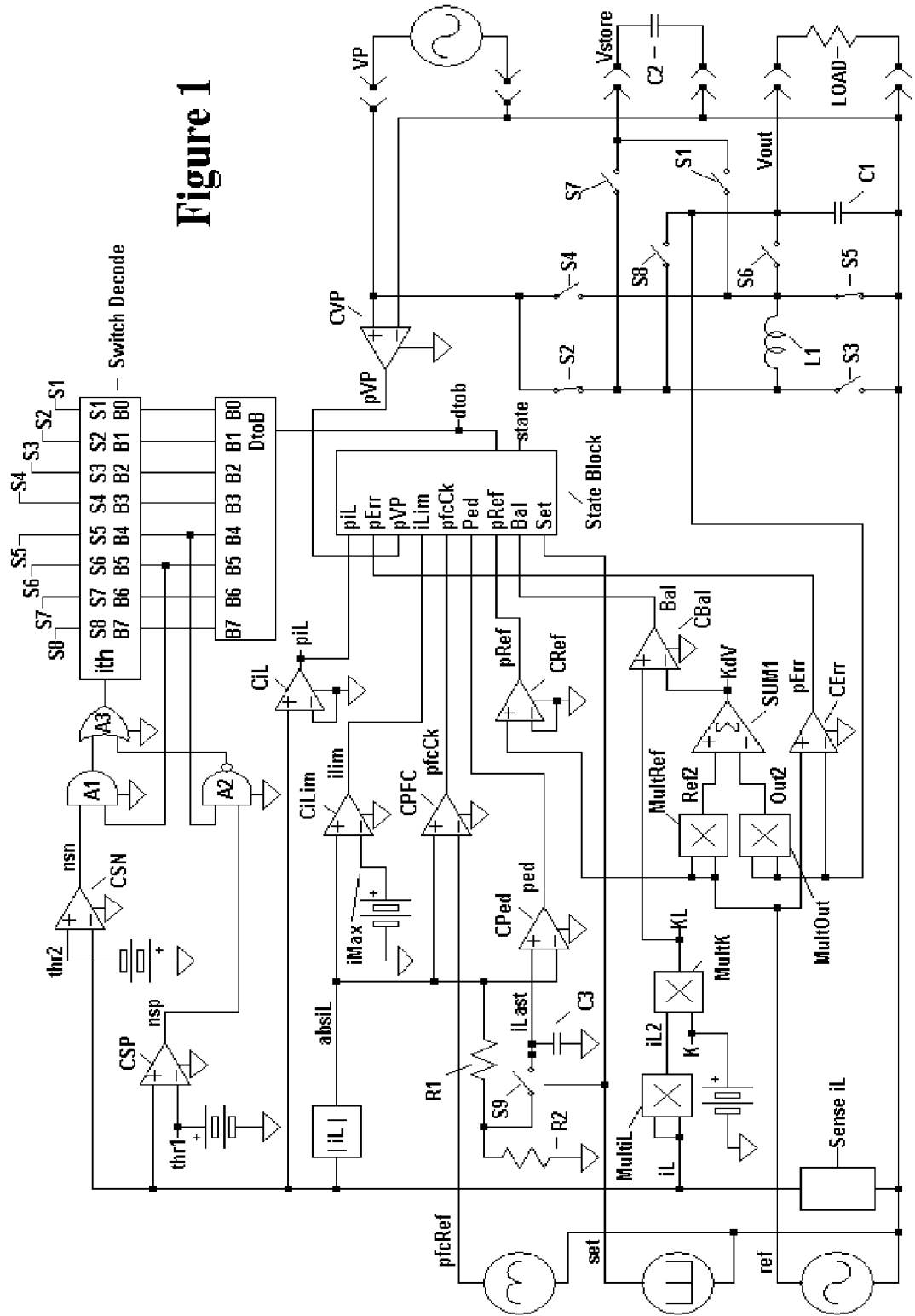
FIG. 1 shows an 8-Switch Power Converter.

FIG. 1 shows an eight-switch bipolar bidirectional power converter with a storage port. All three ports can be AC or DC, unipolar or bipolar, and unidirectional or bidirectional. For simplicity, in this embodiment, the storage port is operated as a DC port to avoid the possibility of needing energy from storage when a stored AC voltage crosses zero. The power input port is here used in unidirectional fashion to demonstrate power factor correction. This embodiment is a very limited subset of the possibilities enabled by this invention. Any port can be voltage or current driven, and the non-driven parameter can be controlled.

In the preferred embodiment, the input port current is regulated to match a PFC waveform input labeled pfcRef. The output port voltage is regulated to match a reference voltage input labeled Ref. The power converter is synchronous, clocked by the signal SET, in this case, at a frequency of 400 KHz. The controls support CCM, DCM, and critical operation and can close both control loops independently with minimal interaction.

For maximum efficiency, energy placed in the switched inductor for the purpose of PFC can be delivered directly to the load as needed, without a second stage of power conversion or the need of extra switching transitions. When the load requirement exceeds the PFC requirement, additional energy is obtained from storage. When PFC energy exceeds the immediate load requirement, excess energy in the switched inductor is placed in storage before or after the load is satisfied. If, instead of demand, there is excess energy at the load, that energy is moved through the inductor to storage. In this, or similar, fashion energy is moved the minimum number of times, and by the most direct path.

This principle of "opportunism" was first described in the '709 patent. Here, opportunism is extended to enable handling of continuous currents in either polarity for any energy transfer. Without that ability, under rapidly changing conditions, there remains the possibility of requiring inductive energy polarity to be reversed before a useful energize or transfer function. The embodiments described in the '709 patent may lose time and energy to reverse the inductive current flow. Furthermore, in the '709 patent the energy transfer must be predicted in order to correctly polarize the inductor charging. Requiring such anticipation necessarily limits opportunism. According to this invention, the polarity of inductor current is not important. Thus, it is possible to handle continuous inductor currents with minimum additional control complexity.

Typically, the PFC portion of the cycle can be controlled by a slow, noncritical auxiliary feedback path that modulates the amplitude of the PFC path to keep the storage voltage within preset limits. Note that with sufficiently deep storage, the output can be kept in regulation for extended periods with no input voltage available. This feature provides uninterruptable power supply functionality. For typical PFC applications, the input current reference signal, pfcRef, will be in phase with the AC line. According to this invention, the input current reference signal does not need to be in phase with the AC line, nor does it need to have any particular frequency or shape. The input current can track any arbitrary waveform. This ability could be particularly useful for controlling mechanical vibration in wind generators, or for variable frequency AC applications, in general.

The power converter of FIG. 1 decodes the outputs of ten comparators to determine the switch settings for energizing the switched inductor, L1, and transferring energy from L1 to a port. SenseiL produces a voltage proportional to the current in L1, iL. Block |iL| produces the absolute value of the voltage iL, absiL. Clock signal set initiates a chopping cycle and momentarily activates switch S9 to store the present value of absil in capacitor C3 as divided by resistors R1 and R2. That voltage, ilast, represents the minimum iL for the preceding chopping cycle.

Comparator CErr produces a high output at pErr if Ref is greater than the output voltage, Vout.

Comparator CVP produces a high output at pVP if the Power input voltage, VP, is greater than zero.

Comparator CiL produces a high output at piL if iL is positive.

Comparator CRef produces a high output at pRef if Ref is greater than zero.

Comparator CPFC produces a high output at pfcCk if pfcRef is greater than absiL.

Comparator CPED produces a high output at ped if iLast is greater than absiL.

Comparator CiLim produces a high output at iLim if absiL is greater than iMax.

Comparator CSP produces a high output at nsp if iL is greater than the slightly positive threshold voltage thr1.

Comparator CNP produces a high output at nsn if iL is less than the slightly negative threshold voltage thr2.

The next series of circuit blocks perform the energy balance calculations described in the '709 patent. MultiL squares iL, producing iL2. MultK multiplies iL2 by a scaling factor, K, to produce KL, representing the inductive energy supply. MultOut squares Vout to give Out2. MultRef squares Ref to give Ref2. SUM1 subtracts Out2 from Ref2, giving KdV, which is proportional to the energy demand at the load. The final comparator, CBal, produces a high output at Bal if supply, KL, is greater than demand, KdV.

Switches S2 and S4 connect VP to L1 terminals 1 and 2 respectively.

Switches S3 and S5 connect the shared return to L1 terminals 1 and 2 respectively.

Switches S7 and S1 connect Vstore to L1 terminals 1 and 2 respectively.

Switches S8 and S6 connect Vout to L1 terminals 1 and 2 respectively.

C2 is the storage capacitor. An ultra capacitor or rechargeable battery or other storage means can be substituted. C1 filters Vout.

DtoB is a standard 8 bit decimal to binary decoder. A1 unblocks the ith limit for positive inductor current responsive to bit B5 of DtoB, A2 unblocks the ith limit for negative inductor current responsive to bit B4 of DtoB. OR gate A3 combines the positive and negative current limits to produce the ith input signal for the SwitchDecode block.

Block SwitchDecode, in combination with the control logic, StateBlock, determine which switches are ON according to the following table.

E indicates Energize. T indicates Transfer.

Transfers continue until the ith threshold and need polarity to be specified, N or P. P means iL flows left to right, N means iL flows right to left.

At the ith threshold transfers change to state 6, recirculation.

All Energize states and Recirculation are unconditional.

Figure 2:
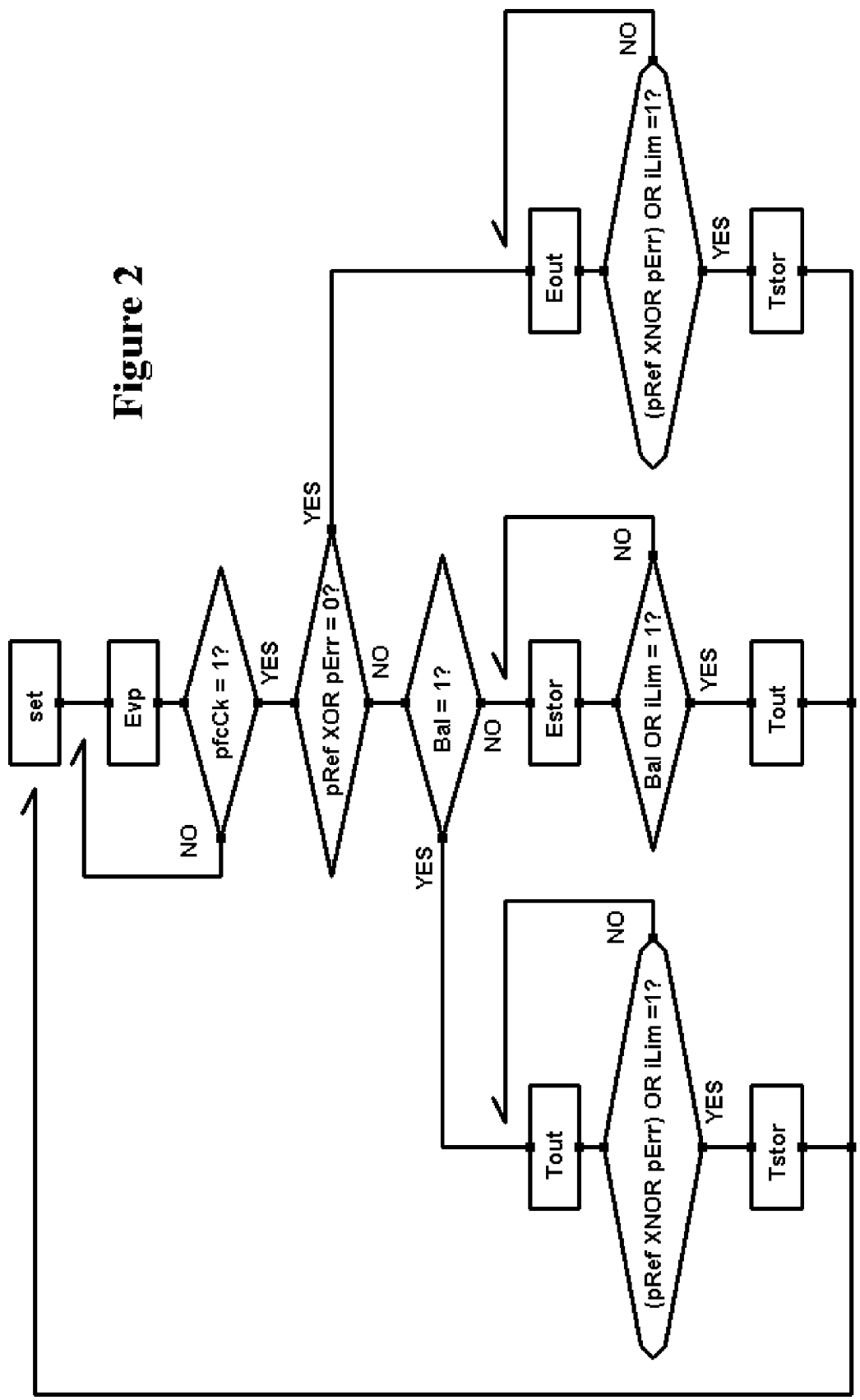
FIG. 2 shows a flowchart for 8-Switch Power Converter.
Figure 3:
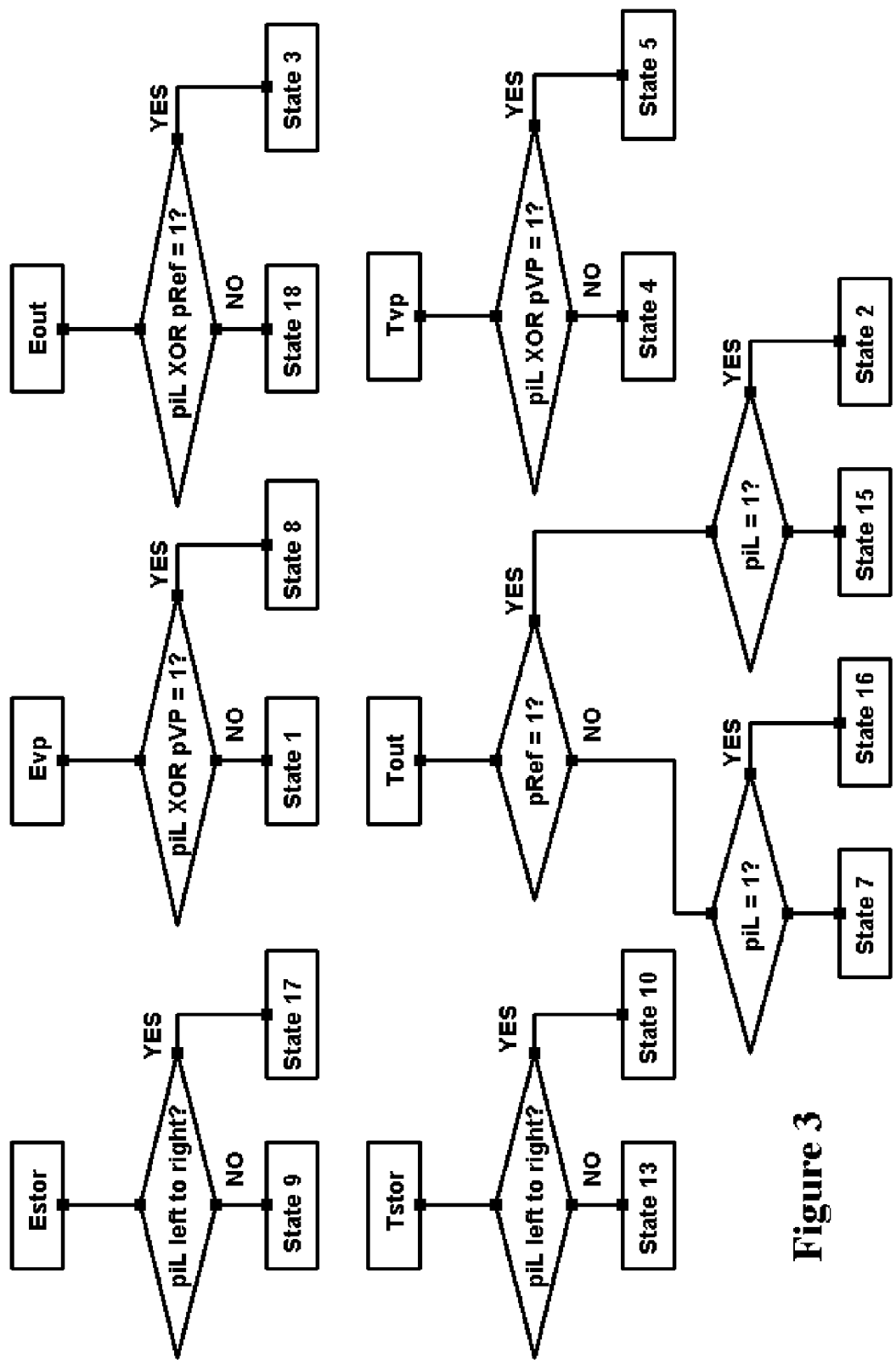
FIG. 3 shows a flowchart Subroutines for 8-Switch Power Converter.

FIG. 7 is decoding truth table to implement the flow chart of FIGS. 2 and 3 in the invention as shown in FIG. 1.

FIG. 2 is a flowchart which describes the behavior of StateBlock. A positive clock edge from set begins the Evp subcycle, which is terminated by a positive edge on pfcCk. If, at that time, the polarity of error is different from the polarity of the reference, a Eout subcyle begins. Eout continues until the polarity of error reverses, or until iLim. The remainder of the chopping cycle is then a Tstor subcycle. If, at the end of the Evp subcycle the polarity of error is not different from the polarity of the reference, the condition of Bal determines the next subcycle. If Bal is true, a Tout subcycle follows until the polarity of error reverses, or until iLim. A Tstor subcycle then completes the chopping cycle. If the Bal test yields not true, an Estor subcycle follows until Bal or until iLim. A Tout subcycle then completes the chopping cycle.

FIG. 3 flowcharts the individual energize functions, Evp, Eout and Estor, and the individual transfer functions Tstor, Tout and Tvp. The choices made in these individual functions serve the purpose of making them independent of the polarity of current in L1. Estor selects state 9 or 17 dependent on piL. Evp selects state 1 or 8 dependent on piL XOR pvp. Eout selects state 3 or 18 dependent on piL XOR pvp.

Tstor selects state 13 or 10 dependent on piL. Tvp selects state 4 or 5 dependent on piL XOR pVP. Tout selects state 2 if piL AND pRef, state 15 if pRef AND (NOT piL), state 7 if (NOT pRef) AND (NOT piL), and state 16 if (NOT pRef) AND piL.

The power converter of FIG. 1 employs predictive energy balancing for better regulation. Because an excess of inductive energy can always be transferred to storage or recirculated, it is not entirely necessary to complete the energy balancing calculations. Instead of relying on the Bal signal for control, an adaptive current limit can be used which would be determined by the recent operation history. The adaptive limit would be determined by a slow feedback loop which acted to cause a small surplus of energy to remain in L1 at the end of a typical chopping cycle. If a substantial amount of excess energy remained, with a substantial amount of time remaining in a chopping cycle, that excess energy could, optionally, be transferred to Vstore. Minimum and maximum limits on continuous current could be regulated in this fashion.

Also, the preferred embodiment power converters taught here use a sensor to detect inductor current. Inductor current can be approximated by substituting a volt-time product with little change in performance.

Figure 4:
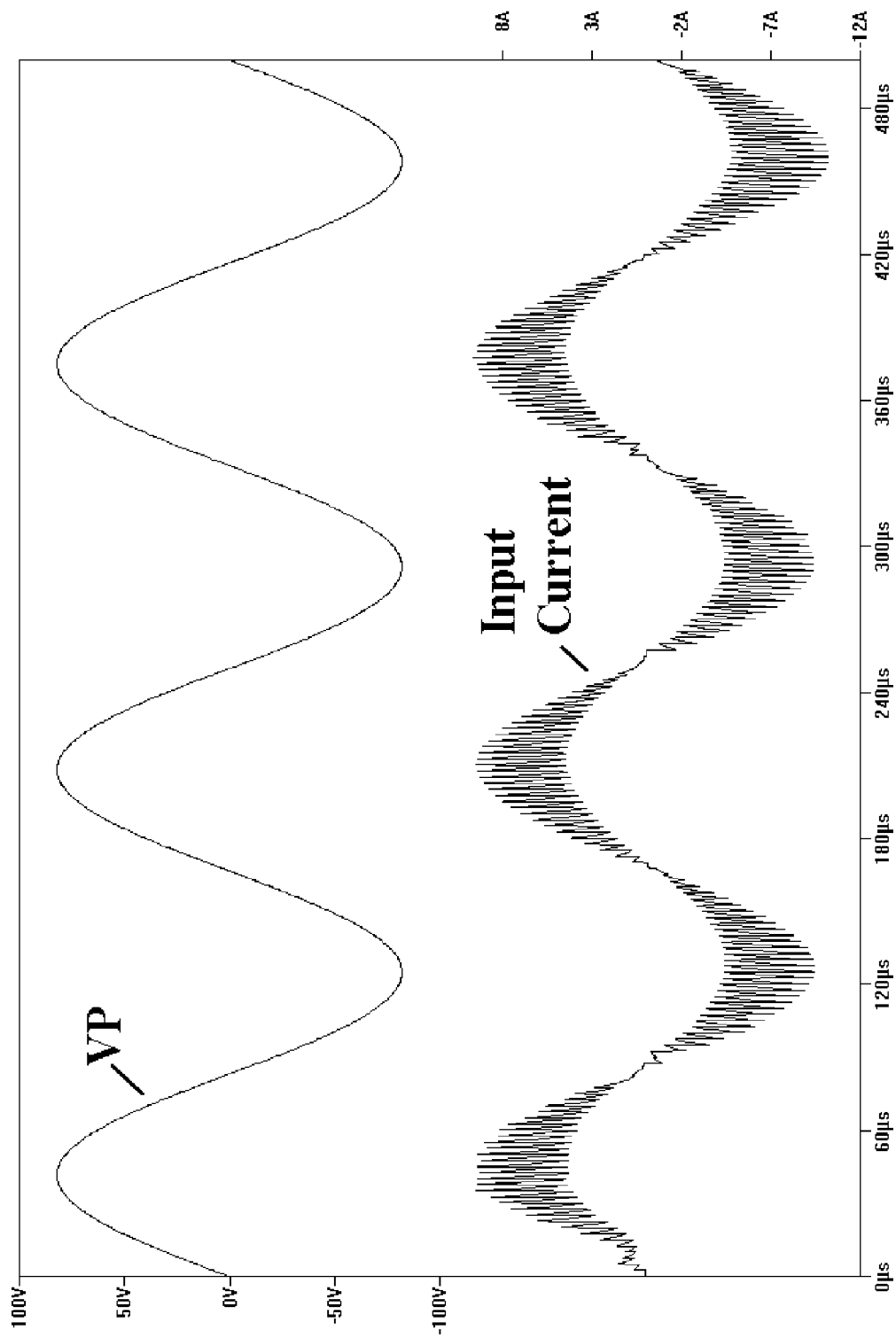
FIG. 4 shows an input Waveforms for 8-Switch Power Converter.

FIG. 4 shows the simulated behavior of the power converter of FIG. 1 for the PFC input current and the power input voltage, VP. The VP is the upper trace, a sine wave with peak-to-peak amplitude of 160 volts at 6000 Hz. A frequency of 60 Hz would be typical for PFC, but the higher frequency shown here illustrates the wide bandwidth capability of the input current regulation. The lower trace is a somewhat averaged representation of the input current, seen to be matching in phase and shape with VP. The addition of a small filter on the input will remove any objectionable higher frequency components from the input current waveform.

Figure 5:
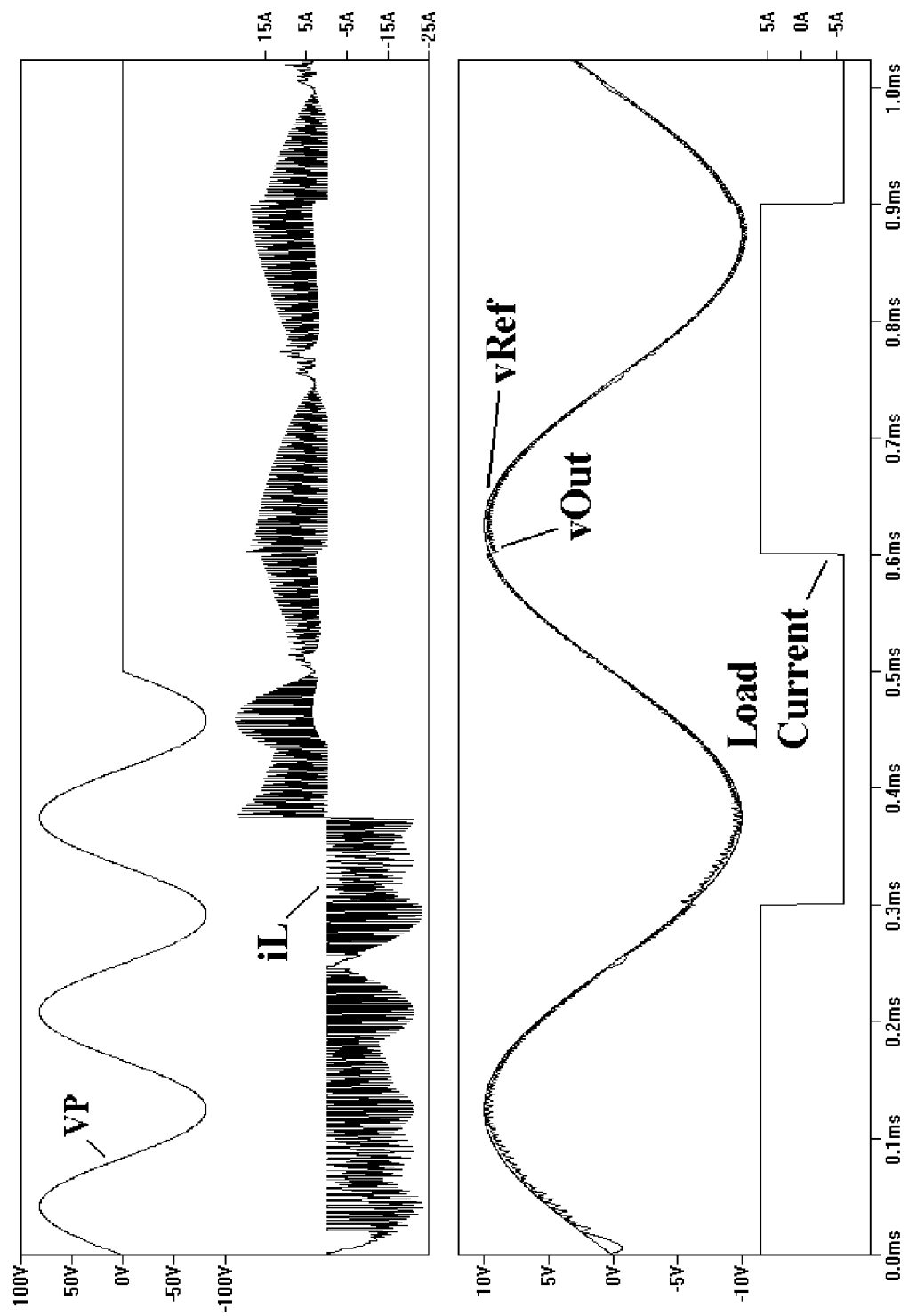
FIG. 5 shows operational Waveforms for 8-Switch Power Converter.

FIG. 5 shows operational waveforms for the converter of FIG. 1. It is split into two axes with the same time scale. Above, as in FIG. 4, is VP. Here, the time period is extended to show that VP ceases after 0.5 mS and remains at zero volts for the duration. Note that the output voltage continues to follow the reference voltage in the absence of VP, even as the load changes polarity.

The power converter can continue to regulate because power is drawn from the storage port. Note that the changeover to storage is completed in a single 5 us chopping cycle with no disturbance in regulation. The lower trace on the upper axis is inductor current, iL. The inductor current can be in either polarity with either polarity of input voltage, and is seen to pass from DCM to CCM and back several times over the 1 ms period shown.

The lower axis of FIG. 5 shows vRef, vOut and Load Current. The reference is a sine wave of +/−10 volt amplitude at a frequency of 2 KHz. Load Current switches between +6 amps and −6 amps with 1 us rise and fall time. The output, vOut can be seen to closely track vRef regardless of input or output polarity or of the polarity of the load.

The power converter of FIG. 1 one can be usefully implemented with six switches with some limitations. The six-switch form can provide functionality for an AC input, unipolar DC output, unidirectional power converter with PFC. Switches 1 and 8 are eliminated. CCM operation is less practical in this reduced topology.

Figure 6:
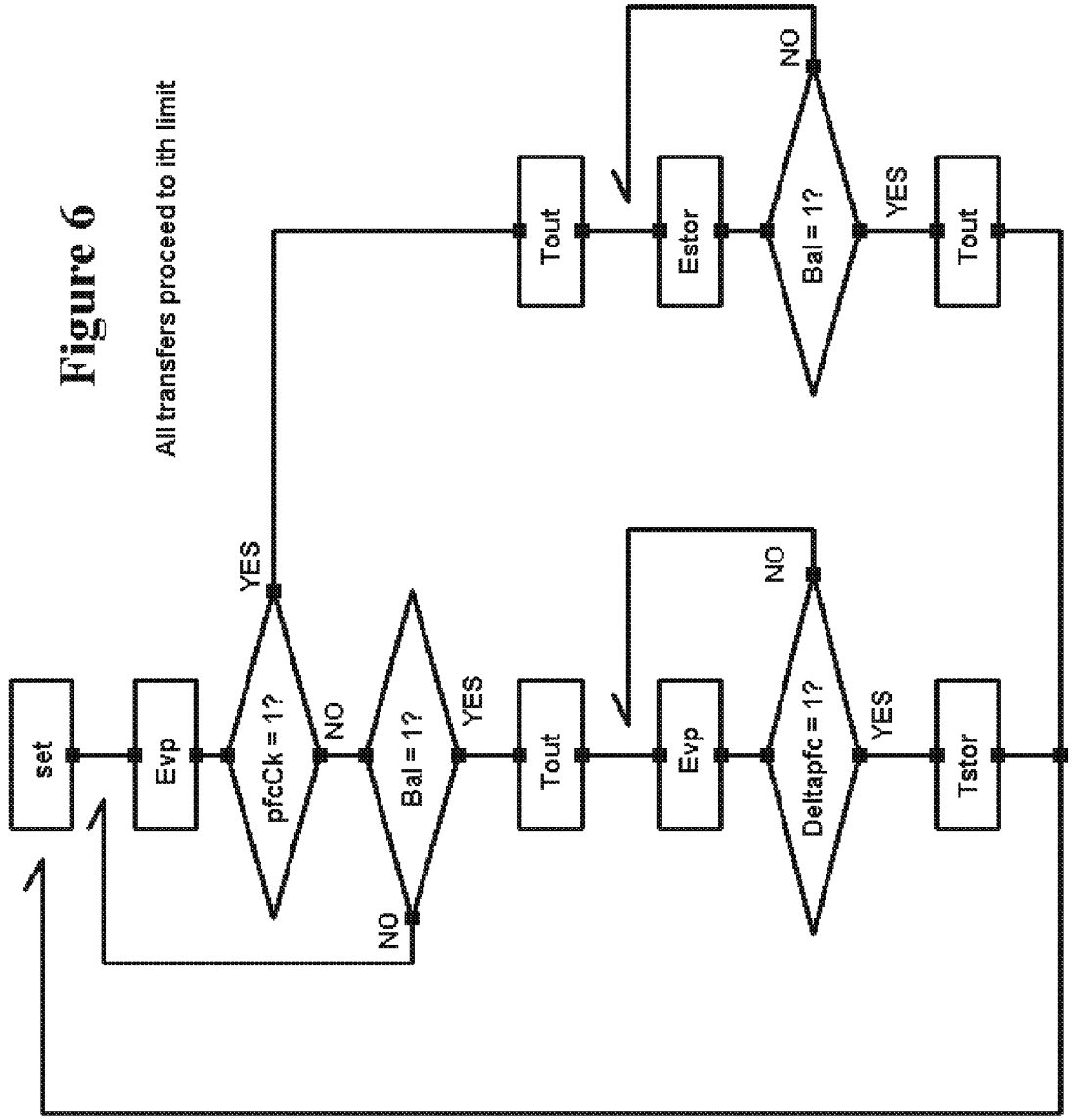
FIG. 6 shows a flowchart for a 6-Switch Power Converter.

FIG. 6 is a flowchart showing one alternate control method. There are two time-sliced control loops. One loop regulates the input current waveform, and the other regulates the output voltage. Energy, in either polarity, is first obtained from VP up to the amount demanded by the load, as predicted by the balance calculation, or, up to the PFC reference, whichever occurs first. That inductive energy is then transferred to the output port up to the ith current limit. If the load requires additional energy after a PFC-limited transfer, the right side of the flowchart shows the appropriate sequence for the second half-cycle. The inductor is energized from the storage port up to predicted balance, then energy is transferred to the output port. If the load did not require the full PFC reference amount, the left side of FIG. 6 applies. The second half-cycle energizes from VP until the remainder of the PFC energy has been loaded into the inductor. Then, that energy is transferred to the storage port.

The performance of the 6-switch variation is equivalent to that of the power converter of FIG. 1, given a unipolar load and unipolar output voltage.

The invention claimed is:

1. A switched-mode power converter comprising:
   an inductor;
   at least three ports, at least one of which is a donor/receptor port;
   a plurality of switches for transferring energy between the ports and the inductor; and
   a controller configured to:
      (1) receive controller input signals based on:
         two or more reference signals;
         a polarity and a magnitude of a voltage or a current of at least one port; and
         a polarity and a magnitude of a current in the inductor; and
      (2) activate the switches based on the controller input signals;
   wherein, during a chopping cycle, energy can be transferred from a first port of the at least three ports to a second port of the at least three ports regardless of the polarity of the inductor current at the beginning of the chopping cycle, such that:
      if the controller determines that the polarity of the inductor current at the beginning of the chopping cycle is positive, then the controller can configure the switches to transfer energy from the first port to the second port; and
      if the controller determines that the polarity of the inductor current at the beginning of the chopping cycle is negative, then the controller can configure the switches to transfer energy from the first port to the second port.

2. The switched-mode power converter of claim 1 where a first controller input signal is based on (i) a first reference signal and (ii) a first voltage or current at a first port.

3. The switched-mode power converter of claim 2 where a second controller input signal is based on (i) a second reference signal and (ii) a second voltage or current at a second port, and the controller first (i) activates the switches based on the first controller input signal and then (ii) activates the switches based on the second controller input signal, both within a single chopping cycle.

4. The switched-mode power converter of claim 3 where:
   the first port is a donor port;
   the second port is a receptor port; and
   the first controller input signal is based on the voltage at the first, donor port; and
   the second controller input signal is based on the voltage or the current at the second, receptor port.

5. The switched-mode power converter of claim 4 where the first and second controller input signals are used for power factor correction to regulate (i) current at the first, donor port and (ii) current or voltage at the second, receptor port.

6. The switched-mode power converter of claim 1 capable of transferring energy directly from a donor port to a receptor port without transferring the energy to or from the donor/receptor port, wherein, when a required amount of energy is not available from the donor port, additional energy is transferred from the donor/receptor port to the receptor port, all within a single chopping cycle.

7. The switched-mode power converter of claim 1 capable of dividing an energize portion of a chopping cycle into two parts, each part energizing the inductor from a different port.

8. The switched-mode power converter of claim 1 capable of dividing a transfer portion of a chopping cycle into two parts, one part transferring energy from the inductor to a first port, and another part transferring energy from the inductor to a second port.

9. The switched-mode power converter of claim 8 capable of dividing an energize portion of the chopping cycle into two parts, each part energizing the inductor from a different port.

10. The switched-mode power converter of claim 1 capable of transferring energy directly from a donor port to a receptor port without transferring the energy to or from the donor/receptor port up to an amount available, then energizing the inductor from the donor/receptor port, and then transferring additional energy from the inductor to the receptor port to satisfy a demand all within a single chopping cycle.

11. The switched-mode power converter of claim 1 capable of adding energy from a first port to the energy in the inductor at the beginning of the chopping cycle so that, after transferring energy from the inductor to a second port, a demand will be met during the chopping cycle.

12. The switched-mode power converter of claim 1 wherein:
the at least three ports include an input port (e.g., VP), a storage port (e.g., Vstore), and an output port (Vout);
at the beginning of the chopping cycle, the polarity of the inductor current can be either positive or negative;
during the chopping cycle, the controller can activate the switches to transfer energy from any of the input, storage, and output ports to any other of the input, storage, and output ports independent of polarity of the inductor current at the beginning of the chopping cycle.

13. The switched-mode power converter of claim 12 wherein the chopping cycle comprises:
a first energize part in which energy is stored into the inductor from any of the input, storage, and output ports;
followed by a second energize part in which energy is stored into the inductor from any other of the input, storage, and output ports; and
followed by a transfer part in which energy is transferred from the inductor to any of the input, storage, and output ports.

14. The switched-mode power converter of claim 13, wherein:
when, at the beginning of the chopping cycle, the inductor current has positive polarity, the controller can activate the switches to transfer energy having positive polarity into the inductor from the input port during the first energize part of the chopping cycle; and
when, at the beginning of the chopping cycle, the inductor current has negative polarity, the controller can activate the switches to transfer energy having negative polarity into the inductor from the input port during the first energize part of the chopping cycle.

15. The switched-mode power converter of claim 12 wherein the chopping cycle comprises:
a first energize part in which energy is stored into the inductor from any of the input, storage, and output ports;
followed by a first transfer part in which energy is transferred from the inductor to any of the input, storage, and output ports;
followed by a second energize part in which energy is stored into the inductor from any of the input, storage, and output ports; and
followed by a second transfer part in which energy is transferred from the inductor to any of the input, storage, and output ports.

16. The switched-mode power converter of claim 15, wherein:
when, at the beginning of the chopping cycle, the inductor current has positive polarity, the controller can activate the switches to transfer energy having positive polarity into the inductor from the input port during the first energize part of the chopping cycle; and
when, at the beginning of the chopping cycle, the inductor current has negative polarity, the controller can activate the switches to transfer energy having negative polarity into the inductor from the input port during the first energize part of the chopping cycle.

* * * * *